Jan. 29, 1929.  
B. FESTINI  
1,700,631  
DEVICE FOR KEEPING MOTOR CYCLE DRIVING CHAINS EVENLY TIGHT  
Filed Nov. 24, 1926  
3 Sheets-Sheet 1

Inventor:  
Bortolo Festini  
By  
Attorney.

Jan. 29, 1929.

B. FESTINI 1,700,631

DEVICE FOR KEEPING MOTOR CYCLE DRIVING CHAINS EVENLY TIGHT

Filed Nov. 24, 1926

Inventor:
Bortolo Festini
By
Attorney.

Jan. 29, 1929.    1,700,631
B. FESTINI
DEVICE FOR KEEPING MOTOR CYCLE DRIVING CHAINS EVENLY TIGHT
Filed Nov. 24, 1926     3 Sheets-Sheet 3
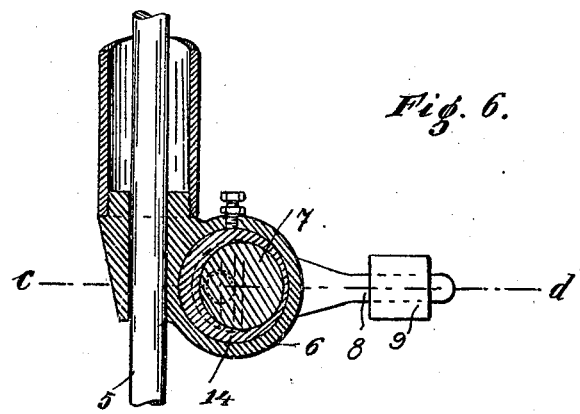
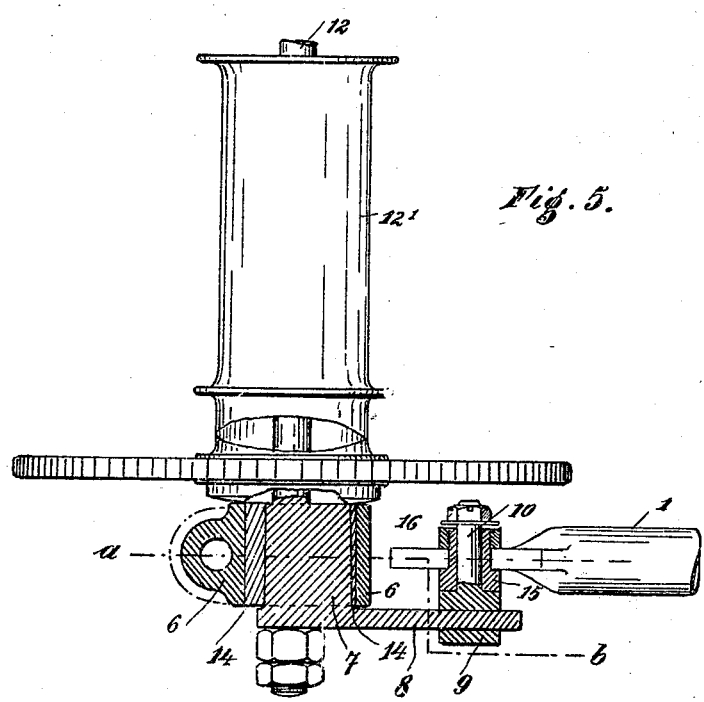
Inventor:
Bortolo Festini

Patented Jan. 29, 1929.

1,700,631

UNITED STATES PATENT OFFICE.

BORTOLO FESTINI, OF BERGAMO, ITALY, ASSIGNOR TO SOCIETÁ FESTINI & C., OF BERGAMO, ITALY.

DEVICE FOR KEEPING MOTOR-CYCLE DRIVING CHAINS EVENLY TIGHT.

Application filed November 24, 1926, Serial No. 150,594, and in Italy November 28, 1925.

It is well known that in motor cycles and similar light cycle-cars, two kinds of frames are used: the rigid frame and the so-called elastic frame. Rigid frames have the advantage of greater strength; elastic frames, formed by two or more parts having a relative motion counteracted by springs, tend to obtain an elastic suspension for the driving wheels, which however evidently reduces the stability and the strength of the frame.

Certain systems have also been proposed, combining the rigid frame with a spring-cushioned wheel; but in such a case, during the spring's resilience yielding of the spring, members having relative motions one to another must allow the driving chain to transmit evenly its work whatever be the position of the system.

Such a problem, which heretofore has not had a practical solution, is solved by the present invention, the essential feature of which is the combination of a rigid frame for motor-cycles or similar vehicles with an elastic suspension of the driving wheel which allows the chain to transmit evenly its work regardless of the position of the system during its oscillations.

In a construction shown in the accompanying drawings and illustrating by way of example one embodiment of the invention, the elastic suspension is formed by a telescoping elastic member, whose external case is fixed to the frame or is an integral part of the same, while the other member moves in a straight line inside the former, compressing a spiral spring and acting as a strong guide for the wheel during its oscillations. As the tension of the driving chain tends to vary during such oscillations, a tension regulating device is associated with the chain for obtaining a good transmission of work in any relative position of the parts. Such a chain-tightening device may be in certain cases, a complication or a delicate point in the system, so another form of the invention, also represented in the drawings, combines a rigid frame with an elastic driving wheel suspension, without the chain tension device. This particular form is characterized by the fact that the hub of the wheel is mounted on the strap of an eccentric fitted on the part moving in a straight line in said telescopic elastic member, and is arranged in such a way that the said strap and consequently the center of the wheel hub follow during the oscillation of the wheel a practically circular motion around the axle of the chain pinion, such axle being fixed to the frame. In this way the transmitting chain always maintains an even working tension regardless of the position of the relatively-moving members.

In the said drawings:

Fig. 5 is a plan view partly in section on line $c$—$d$ of Fig. 5.

Fig. 6 is a section on line $a$—$b$ of Fig. 5.

Figure 1:
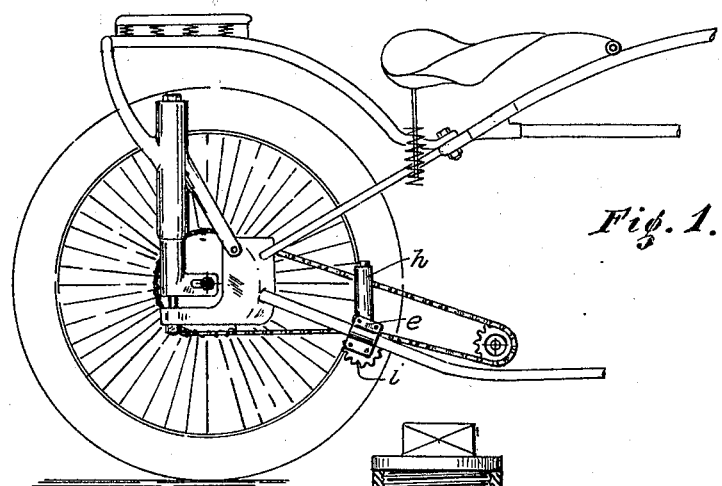
Fig. 1 is a side view of the transmitting chain provided with the device forming the object of the present invention.
Figure 2:
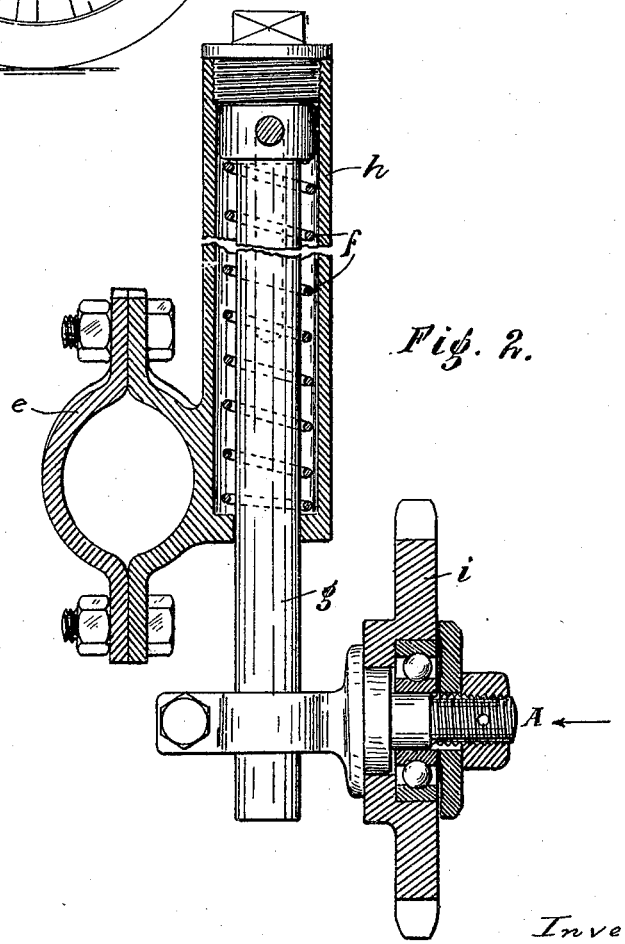
Fig. 2 is an enlarged vertical section showing the details of the elastic device for tightening the chain.
Figure 3:
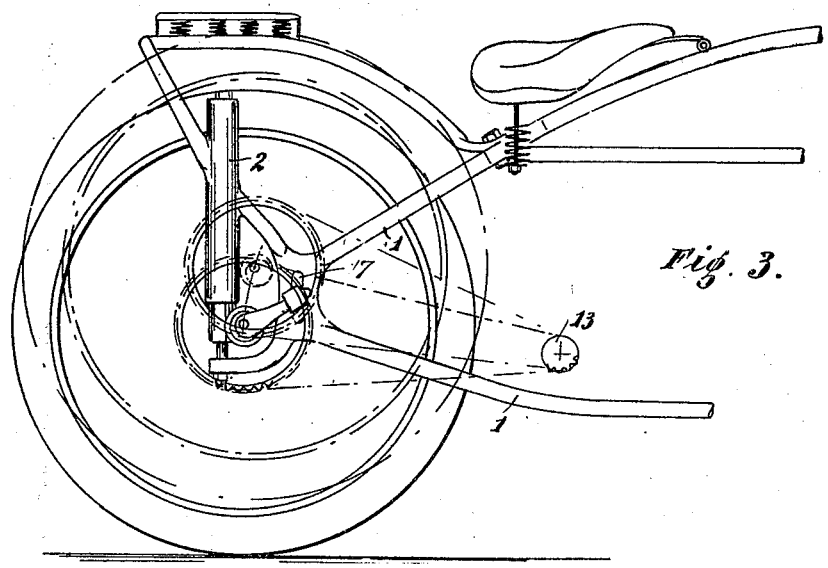
Fig. 3 is a general view of the back part of the frame, showing the second form of the invention above described.
Figure 4:
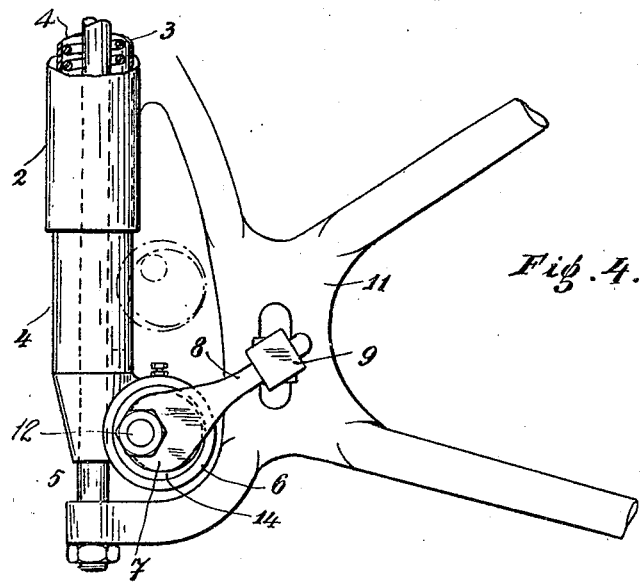
Fig. 4 is an enlarged view showing the connection of the eccentric to the frame and to the resilient member.

In the form shown in Figures 1 and 2, the chain passes on the auxiliary pinion $i$ whose pivot or supporting pin is fixed to a vertical rod $g$ moving in a straight line in the cylindrical case or sleeve $h$, said motion being counteracted by spiral spring $f$ placed within case $h$. Said case is rigidly fixed, for instance by strap $e$, to the frame of the motor-cycle.

The operation of said device is very simple: when through the resilient oscillations of the driving wheel it axis shifts from its usual position, the chain exerts a pressure on pinion $i$ compelling it to fall against the tension of spring $f$. When the axis of the wheel returns to its normal position, the pinion is returned in its former position by said spring $f$, thus keeping the chain's tension constant.

In the form shown in Figs. 3, 4, 5 and 6, a rigid frame 1 carries a cylindrical case 2 fixed to it or forming an integral member of the same and in said case is placed a spiral spring 3 which can be compressed by the vertical movements of an ordinary telescoping member 4 guided by guide-rod 5 fixed to the frame. The moving member 4 bears a strap 6 in which is inserted an eccentric 7 provided with an arm 8 sliding in block 9 that oscillates with the bolt or pin 10 in sleeve 15 fixed to the plate 11 of the frame. The spindle 12 of the hub 12′ of the wheel is in one piece with the eccentric 7 so that in the vertical shifting of the moving member of the telescoping slide under the resilient oscillations, the spindle of the hub shifts with the eccentric. The eccentricity of the latter is calculated in such a way that the spindle moves practically along an arc of a circle having its centre on the axis of pinion 13.

Within the scope of the invention are to be considered some details for adjusting the eccentric and the chain's tension. Between strap 6 fixed to the moving member and the body of the eccentric 7, is interposed an eccentric ring 14 (viz, a ring of variable thickness) by means of which the eccentricity of the eccentric and the tension of the chain can be varied on moving it around in the aforesaid strap. Pin 10 on which rotates the guide block 9 of the arm 8, is held in adjusted position in the oblong slot 17 (Fig. 3) in the frame plate 11 by a threaded bushing 15 provided with a nut 16.

What I claim is:

1. In a bicycle, motor-cycle or the like, the combination of a rigid frame, and an elastic suspension for the driving wheel; said suspension embodying a member having a straight-line shift, an eccentric borne by said member and being fixed with relation to the spindle of said driving wheel so that during the straight-line shift of said moving member, the said wheel moves in an arcuate path having its centre on the axis of the pinion of the driving chain, which centre is a fixed point in the frame.

2. In a bicycle, motor-cycle or the like, the combination of a rigid frame provided with a slot, and an elastic suspension for the driving wheel; said suspension embodying a member having a straight-line shift, an eccentric borne by said member and being fixed with relation to the spindle of said driving wheel so that during the straight line shift of said moving member, the said wheel moves in an arcuate path having its centre on the axis of the pinion of the driving chain, which centre is a fixed point in the frame, said eccentric having a guiding arm sliding in a head pivoted to a member adjustably mounted in said slot.

3. In a bicycle, motor-cycle or the like, the combination of a rigid frame provided with a slot, and an elastic suspension for the driving wheel; said suspension embodying a member having a straight line shift, an eccentric borne by said member and being fixed with relation to the spindle of said driving wheel so that during the straight line shift of said moving member, the said wheel moves in an arcuate path having its centre on the axis of the pinion of the driving chain, which centre is a fixed point in the frame, said eccentric having a guiding arm sliding in a head pivoted to a member adjustably mounted in said slot, and means for adjusting the chain's tension embodying a ring of variable thickness placed between the eccentric and its strap.

Signed at Milan, Italy, this third day of November, A. D. 1926.

BORTOLO FESTINI.